United States Patent
Rosengren et al.

(10) Patent No.: US 9,431,868 B2
(45) Date of Patent: Aug. 30, 2016

(54) MANUAL OVERRIDE DEVICE FOR AN ELECTRIC ACTUATOR AND METHOD FOR USE

(75) Inventors: Gary Rosengren, Brooklyn Park, MN (US); Jeremy R. Forbord, Mound, MN (US); Igor Glikin, Plymouth, MN (US)

(73) Assignee: TOLOMATIC, INC., Hamel, MN (US)

( * ) Notice: Subject to any disclaimer, the term of this patent is extended or adjusted under 35 U.S.C. 154(b) by 1093 days.

(21) Appl. No.: 13/009,619

(22) Filed: Jan. 19, 2011

(65) Prior Publication Data

US 2012/0019109 A1 Jan. 26, 2012

Related U.S. Application Data

(60) Provisional application No. 61/296,108, filed on Jan. 19, 2010.

(51) Int. Cl.
*F16H 25/20* (2006.01)
*H02K 7/00* (2006.01)

(52) U.S. Cl.
CPC ......... *H02K 7/00* (2013.01); *F16H 2025/2065* (2013.01)

(58) Field of Classification Search
CPC .............................................. F16H 2025/2065
USPC ................... 74/89.45, 724; 81/52, 436, 177.2
See application file for complete search history.

(56) References Cited

U.S. PATENT DOCUMENTS

| | | | |
|---|---|---|---|
| 2,674,706 A * | 4/1954 | Knosp et al. .................... 318/8 |
| 3,679,172 A * | 7/1972 | Kerkau ........................ 251/229 |
| 3,815,435 A * | 6/1974 | Eschenbacher et al. .. 74/424.87 |
| 3,851,541 A * | 12/1974 | Ploss et al. .................. 74/89.42 |
| 3,969,807 A * | 7/1976 | Takizawa et al. ............ 29/564.6 |
| 4,040,445 A * | 8/1977 | McCormick ............. 137/596.18 |
| 4,072,063 A * | 2/1978 | Nauman ......................... 74/405 |
| 4,114,469 A * | 9/1978 | Stratienko ................... 74/89.38 |
| 4,198,872 A * | 4/1980 | Metz ................................ 74/57 |
| 4,213,480 A * | 7/1980 | Orum et al. .................. 137/556 |
| 4,250,762 A * | 2/1981 | Weatherby ................... 74/89.38 |
| 4,266,437 A * | 5/1981 | Obergfell ..................... 74/89.37 |
| 4,286,793 A * | 9/1981 | Ploss et al. .................... 277/354 |
| 4,369,011 A * | 1/1983 | Ploss ............................ 411/223 |
| 4,393,319 A * | 7/1983 | Bock ............................. 310/80 |
| 4,438,662 A * | 3/1984 | Walton et al. ................ 74/625 |
| 4,489,248 A * | 12/1984 | Petersen ........................ 310/76 |
| 4,496,865 A * | 1/1985 | Allen et al. .................... 310/80 |
| 4,521,707 A * | 6/1985 | Baker ............................ 310/80 |
| 4,614,128 A * | 9/1986 | Fickler ........................ 74/89.31 |

(Continued)

FOREIGN PATENT DOCUMENTS

| | | |
|---|---|---|
| DE | 69416818 T2 | 9/1999 |
| EP | 0671070 A1 | 9/1995 |

(Continued)

*Primary Examiner* — William Kelleher
*Assistant Examiner* — Gregory Prather
(74) *Attorney, Agent, or Firm* — Dorsey & Whitney LLP

(57) ABSTRACT

The present disclosure relates to a manual override tool for an electric actuator. The manual override tool includes an accessible first end, a shaft operably connected with the first end and is movable in a linear direction and is rotatable, and a plurality of gear teeth on the shaft. The accessible first end is used to engage and disengage the plurality of gear teeth with a plurality of notches provided on an interior rotor of the electric actuator, such that the accessible first end may be used to manually operate the electric actuator.

21 Claims, 3 Drawing Sheets

(56) References Cited

U.S. PATENT DOCUMENTS

| | | | |
|---|---|---|---|
| 4,643,710 A * | 2/1987 | Troutner | 494/60 |
| 4,664,136 A * | 5/1987 | Everett | 137/85 |
| 4,860,638 A * | 8/1989 | Hosono et al. | 91/536 |
| 4,867,018 A * | 9/1989 | Spector | 81/439 |
| 4,987,822 A * | 1/1991 | Stoll | 91/358 R |
| 5,053,685 A * | 10/1991 | Bacchi | 318/135 |
| 5,074,519 A * | 12/1991 | Pettus | 251/14 |
| 5,087,845 A * | 2/1992 | Behrens et al. | 310/77 |
| 5,098,214 A * | 3/1992 | Solano et al. | 403/12 |
| 5,099,161 A * | 3/1992 | Wolfbauer, III | 310/80 |
| 5,121,042 A * | 6/1992 | Ako | 318/657 |
| 5,130,585 A * | 7/1992 | Iwamatsu et al. | 310/59 |
| 5,142,172 A * | 8/1992 | Horikoshi et al. | 310/13 |
| 5,214,971 A * | 6/1993 | Burton et al. | 74/89.13 |
| 5,234,386 A * | 8/1993 | Nagai et al. | 474/148 |
| 5,295,756 A * | 3/1994 | Ohta | 403/11 |
| 5,334,897 A * | 8/1994 | Ineson et al. | 310/89 |
| 5,363,741 A * | 11/1994 | Takada et al. | 92/13.5 |
| 5,429,011 A * | 7/1995 | Stevenson | 74/89.13 |
| 5,445,045 A | 8/1995 | Nagai et al. | |
| 5,454,240 A * | 10/1995 | Whitney, Jr. | 70/209 |
| 5,483,426 A * | 1/1996 | Lewis et al. | 362/514 |
| 5,491,372 A * | 2/1996 | Erhart | 310/80 |
| 5,499,547 A * | 3/1996 | Nagai et al. | 74/89.34 |
| 5,535,648 A * | 7/1996 | Braun et al. | 81/63.1 |
| 5,544,970 A * | 8/1996 | Studer | 403/399 |
| 5,557,154 A * | 9/1996 | Erhart | 310/80 |
| 5,606,902 A * | 3/1997 | Hosono et al. | 92/88 |
| 5,614,778 A * | 3/1997 | Terao et al. | 310/80 |
| 5,617,772 A * | 4/1997 | Hosono et al. | 92/117 A |
| 5,637,940 A * | 6/1997 | Nagai et al. | 310/80 |
| 5,676,016 A * | 10/1997 | Nagai et al. | 74/89.32 |
| 5,685,390 A * | 11/1997 | Chikuma et al. | 180/444 |
| 5,689,994 A * | 11/1997 | Nagai et al. | 74/89.32 |
| 5,747,896 A * | 5/1998 | Nagai et al. | 310/20 |
| 5,761,960 A | 6/1998 | Nagai et al. | |
| 5,784,922 A * | 7/1998 | Ozaki et al. | 74/89.37 |
| 5,796,187 A * | 8/1998 | Nagai et al. | 310/20 |
| 5,799,543 A * | 9/1998 | Nagai et al. | 74/490.09 |
| 5,809,831 A * | 9/1998 | Nagai et al. | 74/89.4 |
| 5,884,549 A * | 3/1999 | Hosono et al. | 92/5 R |
| 5,912,520 A * | 6/1999 | Kobayashi et al. | 310/80 |
| 5,954,463 A * | 9/1999 | Jore | 408/239 R |
| 5,966,988 A * | 10/1999 | Aiso et al. | 74/89.34 |
| 6,000,292 A * | 12/1999 | Nagai et al. | 74/89.33 |
| 6,003,428 A * | 12/1999 | Mundie et al. | 91/459 |
| 6,062,106 A * | 5/2000 | Jackson et al. | 74/724 |
| 6,067,868 A * | 5/2000 | Nakamura et al. | 74/89.35 |
| 6,081,051 A * | 6/2000 | Kitazawa et al. | 310/20 |
| 6,128,982 A * | 10/2000 | Gwin, Sr. | 81/452 |
| 6,145,395 A * | 11/2000 | Swanson et al. | 74/89.33 |
| 6,177,743 B1 * | 1/2001 | Hartramph et al. | 310/89 |
| 6,186,770 B1 * | 2/2001 | Ziv-Av | 425/590 |
| 6,223,971 B1 * | 5/2001 | Sato | 228/45 |
| 6,278,077 B1 * | 8/2001 | Cecil | 219/86.41 |
| 6,293,172 B1 * | 9/2001 | Smith | 81/57.13 |
| 6,357,100 B2 * | 3/2002 | Speller et al. | 29/407.09 |
| 6,362,547 B1 * | 3/2002 | Peterson et al. | 310/80 |
| 6,531,798 B1 * | 3/2003 | Palmero | 310/112 |
| 6,603,228 B1 * | 8/2003 | Sato | 310/83 |
| 6,666,115 B2 * | 12/2003 | Liu | 81/451 |
| 6,718,837 B2 * | 4/2004 | Sato et al. | 74/89.33 |
| 6,756,707 B2 * | 6/2004 | Hochhalter et al. | 310/20 |
| 7,069,826 B2 * | 7/2006 | Tilton | 81/457 |
| 7,073,415 B2 * | 7/2006 | Casutt et al. | 81/451 |
| 7,107,872 B2 * | 9/2006 | Chu | 74/423 |
| 7,197,968 B2 * | 4/2007 | Bubel | 81/475 |
| 7,438,457 B2 * | 10/2008 | Whynott | 362/524 |
| 7,471,020 B2 * | 12/2008 | Abrahamsen | 310/20 |
| 7,484,442 B2 * | 2/2009 | Chen | 81/475 |
| 7,541,707 B2 * | 6/2009 | Hochhalter et al. | 310/80 |
| 7,549,819 B2 * | 6/2009 | Stauss | 403/387 |
| 7,591,604 B2 * | 9/2009 | Roberts | 403/101 |
| 7,790,229 B2 * | 9/2010 | Floyd | 427/248.1 |
| 7,816,881 B2 | 10/2010 | Wiegers et al. | |
| 7,880,345 B2 | 2/2011 | Hoffmann et al. | |
| 7,939,979 B2 * | 5/2011 | Hochhalter et al. | 310/80 |
| 7,947,047 B2 * | 5/2011 | Arnal | 606/104 |
| 8,231,635 B2 * | 7/2012 | Sharifi-Mehr et al. | 606/104 |
| 8,277,349 B2 | 10/2012 | Erhart et al. | |
| 8,408,104 B2 * | 4/2013 | Lin | 81/475 |
| 8,424,418 B1 * | 4/2013 | Wuester et al. | 81/54 |
| 8,678,988 B2 * | 3/2014 | Lahmann | 494/64 |
| 2001/0027146 A1 * | 10/2001 | Spaziani | E05F 15/697 477/3 |
| 2003/0167864 A1 * | 9/2003 | Biester et al. | 74/89.23 |
| 2004/0120615 A1 * | 6/2004 | Chase | 384/42 |
| 2007/0137329 A1 * | 6/2007 | Everson et al. | 74/89.23 |
| 2008/0012522 A1 * | 1/2008 | Wiegers et al. | 318/638 |
| 2008/0048514 A1 * | 2/2008 | Hoffmann et al. | 310/78 |
| 2009/0031957 A1 * | 2/2009 | Floyd | 118/729 |
| 2011/0053723 A1 * | 3/2011 | Erhart et al. | 475/1 |

FOREIGN PATENT DOCUMENTS

| | | |
|---|---|---|
| EP | 1780873 A1 | 5/2007 |
| EP | 1845605 A2 | 10/2007 |
| EP | 2401525 A2 | 1/2012 |
| WO | WO 95/08860 A1 | 3/1995 |
| WO | WO 2010/099325 A2 | 9/2010 |

* cited by examiner

MANUAL OVERRIDE DEVICE FOR AN ELECTRIC ACTUATOR AND METHOD FOR USE

FIELD OF THE INVENTION

The present disclosure relates to a manual override device for use in an electric actuator. More particularly, the present disclosure relates to an improved manual override device for use in an electric actuator to allow for manually and linearly moving the linear motion assembly or thrust tube assembly.

BACKGROUND OF THE INVENTION

Various industries, such as the manufacturing industry, have utilized linear actuators to control the movements of automated welding guns, automatic clamping fixtures, injection molding fixtures, and any application in which controlled and accurate linear motion is required. Such linear actuators may be driven by various mechanisms, including electric, pneumatic, or hydraulic actuators. Though actuation is typically an automated process, during actuator set-up procedures it is sometimes necessary to manually change the linear position of the actuator. Additionally, sometimes the drive mechanisms for linear actuators lose power or become stuck, thus preventing free movement of the linear motion assembly or thrust tube assembly. In order to adjust the linear position of the actuator thrust rod to continue normal operation of the linear actuator, the actuator thrust rod may need to be manually positioned by an operator. This may be done by inserting a screw driver or similar tool into an access point to manually move the rotor by pushing or prying notches on the rotor. However, such techniques for manual actuator positioning can be difficult, inaccurate, and slow.

Accordingly, there is a need in the art for an improved manual override device for a linear actuator which overcomes the deficiencies and limitations of the prior art, and in particular, a manual override device which is designed for use in an electric actuator. This includes a need for a manual override device that quickly and easily engages the linear actuator which also enables efficient and accurate positioning.

SUMMARY OF THE INVENTION

The present disclosure relates to a manual override device and method for use for an electric actuator. In some embodiments, the override device can be used to manually operating a linear actuator. In certain embodiments, a manual override tool for an actuator may comprise a shaft having an accessible first end and a plurality of gear teeth. The shaft may further have an accessible first end configured to control engagement and disengagement of the plurality of gear teeth with a plurality of notches provided on an interior rotor of an actuator. Such engagement may permit an operator to manually operate the electric actuator.

In another embodiment, a manual override tool for an actuator comprises a shaft having an accessible first end and a plurality of gear teeth, and a means for engaging and disengaging the plurality of gear teeth with a plurality of notches provided on an interior rotor of the actuator. The gear teeth may be configured such that the accessible first end may be used to manually operate the electric actuator.

In a further embodiment, a method for using a manual override tool for a linear actuator comprises engaging a plurality of notches provided on a rotor of the linear actuator with a manual override tool. The manual override tool may comprise a shaft having an accessible first end and a plurality of gear teeth. The method may further include rotating the accessible first end to manually position the linear actuator. The method may also include disengaging the manual override tool from the plurality of notches.

While multiple embodiments are disclosed, still other embodiments of the present disclosure will become apparent to those skilled in the art from the following detailed description, which shows and describes illustrative embodiments of the disclosure. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the embodiments will be better understood from the following description taken in conjunction with the accompanying Figures, in which:

DETAILED DESCRIPTION

The present disclosure relates to novel and advantageous manual override devices for use in an electric actuator. More particularly, the present disclosure relates to improved manual override devices for use in an electric actuator to allow for manually and linearly moving the linear motion assembly or thrust tube assembly. A manual override device according to the present disclosure may allow an operator to change the linear position of an actuator linear motion assembly, thrust tube assembly, or thrust rod, for example, during set up procedures or in the event of a power failure. Although the improved manual override device for use in an actuator of the present invention has applicability to a variety of work pieces and in a variety of industries, it has particular application to the manual override of an actuator used in the actuation of welding guns, clamping fixtures, injection molding fixtures, and any application in which controlled and accurate linear motion is required.

The various embodiments of the manual override device of the present disclosure may be used with any suitable electric actuator. One example of an electric actuator in which the various embodiments of the improved manual override device may be used is the electric actuator described in U.S. Pat. No. 7,541,707, which is hereby incorporated by reference herein in its entirety. A typical linear actuator may work by extending and retracting a thrust member, sometimes with a work piece affixed to its end to perform certain tasks. Particularly, electric screw-driven actuators may typically include a thrust tube assembly, a screw shaft, a rotor, and a work piece connection end, and may further include a housing for the motor and actuator assembly. Within the housing, a motor can be coupled to the rotor to rotate the assembly, and through it, the screw shaft. The screw shaft engages a nut coupled with the thrust tube assembly, which transfers rotary motion of the screw shaft into linear motion of the thrust tube assembly. As described above, access to the rotor may be provided through an access point or other opening in the actuator housing. This opening may be sufficiently wide in order to accommodate a screw driver or similar tool to enable an operator to manually manipulate the rotor in order to linearly position the actuator in the case that manual adjustment or control becomes necessary or desirable, such as when the drive mechanism for the linear actuator loses power or otherwise becomes stuck, thus preventing free movement of the linear motion assembly or thrust tube assembly.

Figure 1:
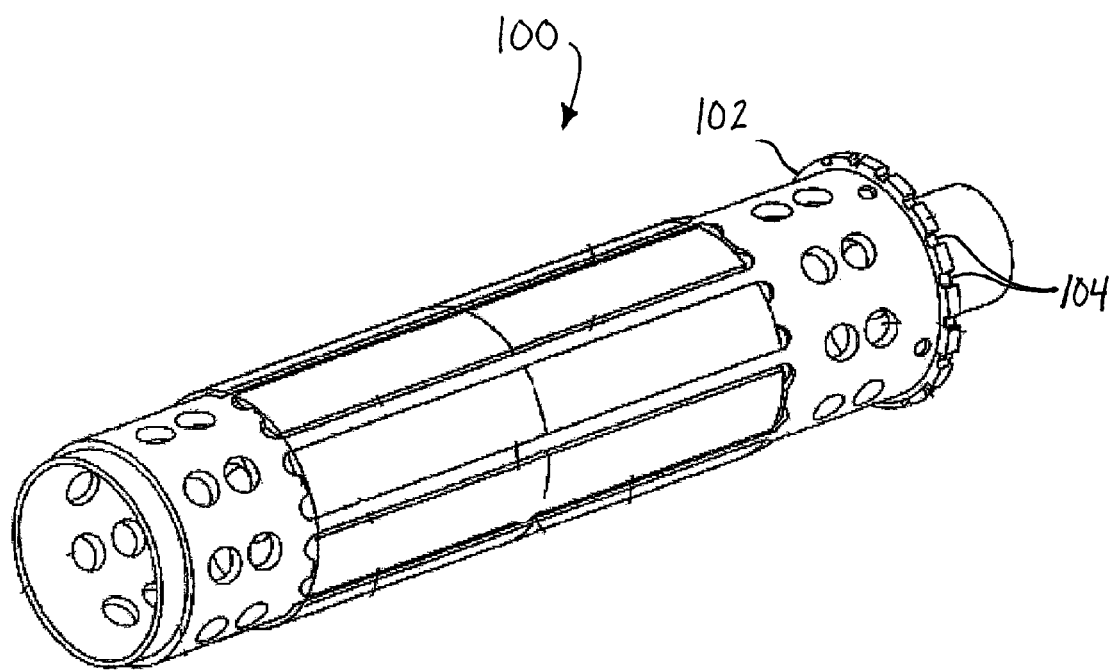
FIG. 1 is a perspective view of one embodiment of the interior rotor of an electric actuator.

More specifically, as shown in FIG. 1, an electric actuator may include an interior rotor 100, such as the rotor of the actuator of U.S. Pat. No. 7,541,707, described in detail therein. The distal end of the rotor may include a radially extending flange 102. The outer peripheral edge of the flange 102 may include a plurality of notches, gear teeth, or otherwise recessed areas 104. In some electric actuators, these notches 104 may be accessible through an access hole of the housing of the electric actuator to provide a manual override feature. For example, if a crash or lockup occurs or if the motor power is lost, the end of a screwdriver or other tool, for example, can be inserted through the hole of the housing to engage the notches 104 and manually rotate the flange 102 and thus the rotor 100. However, such access to the notches 104 in such actuators is very limited and makes manual rotation difficult. The operator may further have a restricted view of notches 104 through the access point, further complicating the manual override process.

Figure 2:
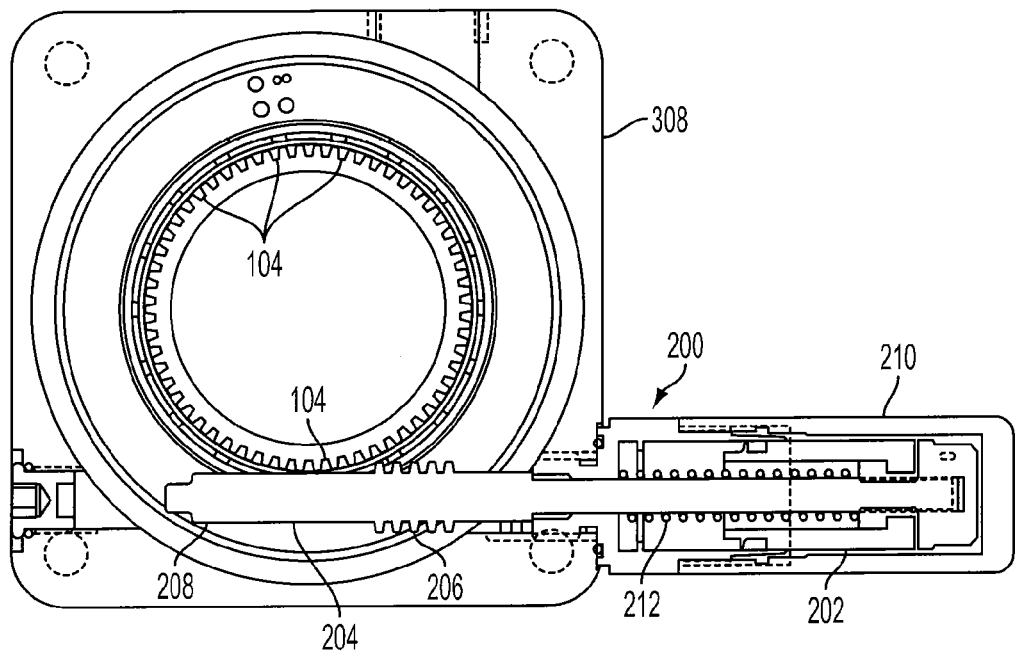
FIG. 2 is a cross-sectional view of a manual override device according to an embodiment of the present disclosure in a disengaged position.

As shown in FIG. 2, which shows a manual override device in a disengaged position, an improved manual override device may comprise a manual override tool 200 having an accessible first end 202, a rod or shaft 204, which is movable in a linear direction and is rotatable, a plurality of gear teeth or threads 206 on the shaft, a distal end portion 208, and a cap 210 for covering the accessible first end 202 when not in use. The cap 210 may be attached at the first end 202 by any suitable means, such as but not limited to, press-fit, snap-fit, bayonet connection, threads, etc. The actuator is generally in a normal operating mode when the manual override device is in a disengaged position. In some embodiments, a compression spring 212 may be used to bias the shaft 204 in the disengaged position.

Figure 3:
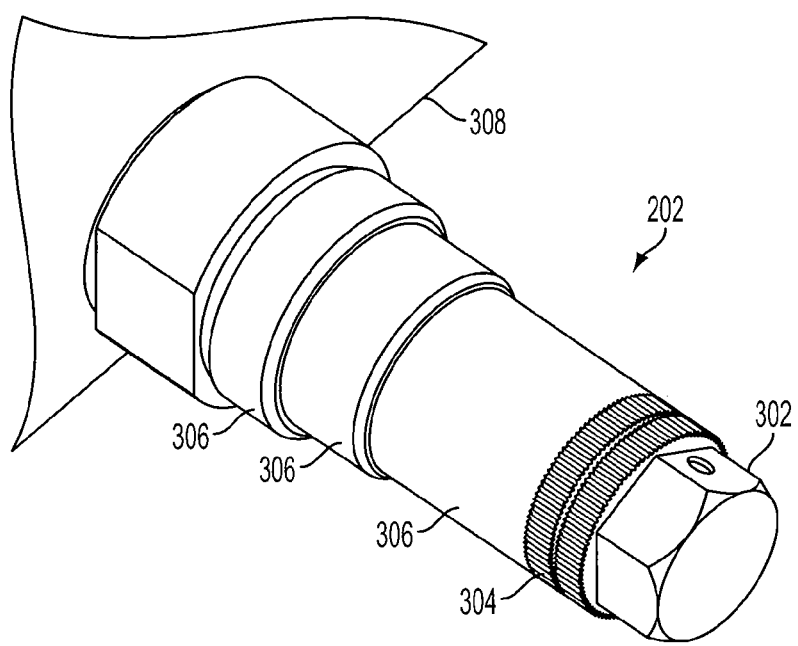
FIG. 3 is a perspective view of the accessible first end of a manual override device according to an embodiment of the present disclosure.

The accessible first end 202, as shown in FIG. 3, may include a nut 302 and grooves, ridges, or knurled edges 304. Nut 302 may be hexagonal in design, as pictured, but it will be understood that any design enabling rotation of first end 202 may be employed. The first end 202 may also have two or more telescoping portions 306. During operation of the manual override device, lubricants and other foreign materials may make manual rotation difficult. Edges 304 may provide additional grip for an operator attempting to manipulate telescoping portions 306. The accessible first end 202 may generally be exterior to the actuator housing 308, such that it is accessible to an operator to engage, use, and disengage the manual override device. First end 202 may comprise any sufficiently durable material, and in some embodiments may comprise a metal alloy, such as but not limited to bronze, stainless steel, etc., or a plastic or other polymer, or a combination of any suitable materials.

The gear teeth 206 on the shaft 204 may be adapted to engage the notches 104 on the flange 102 of the rotor 100. This engagement provides a mechanical advantage by allowing the operator to generate torque while turning the manual override tool via the accessible first end 202. In one embodiment, the ratio between the gear teeth 206 and notches 104 may be about 60:1. However, it is recognized that other suitable ratios may be used.

In one embodiment, the manual override tool may be separate from the actuator and placed in position only when manual override is necessary by inserting the manual override tool, with the distal end portion 208 first, into a hole in the side of the actuator configured for the manual override tool. In such embodiments, a compression spring biasing the manual override tool in a disengaged position may be unnecessary, as the tool may be disengaged by removing it from the actuator. In other embodiments, the manual override tool may be an integral part of the actuator; however, a variety of viable locking mechanisms are contemplated, such as press-fit, snap-fit, bayonet connection, or screw threads.

Figure 4:
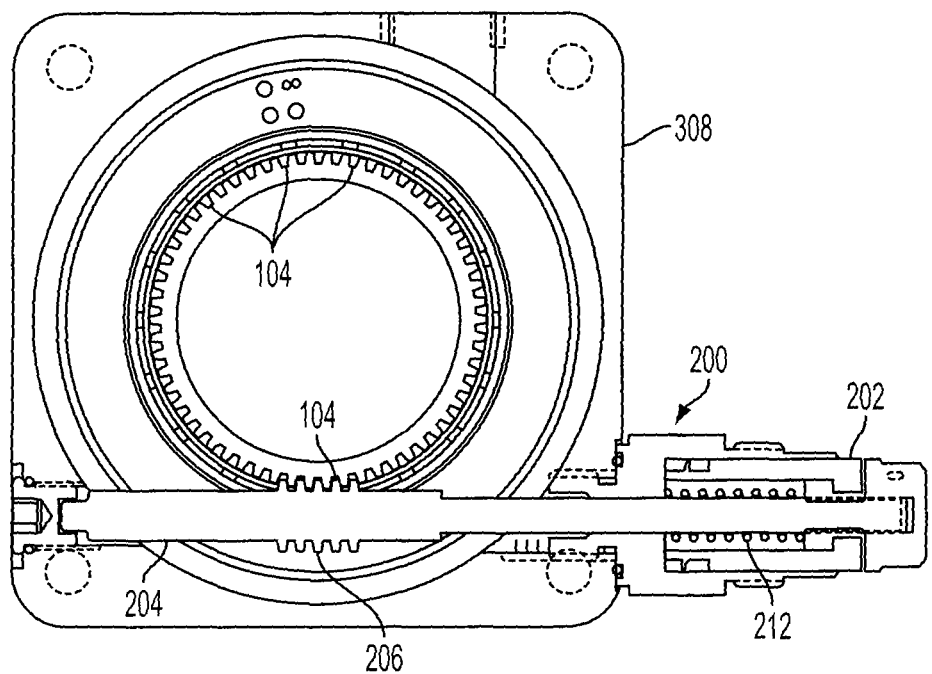
FIG. 4 is a cross-sectional view of a manual override device according to an embodiment of the present disclosure in an engaged position.

In operation, in one embodiment, such as an embodiment where the manual override tool is an integral part of the actuator, the cap 210 may be removed or otherwise repositioned away from the accessible first end 202. The accessible first end 202 may then be used by the operator to engage the gear teeth on the shaft 204 with the notches 104 on the flange 102 of the rotor 100. In one embodiment, this may be done by pushing or otherwise moving the telescoping portions 306 of the first end 202 within one another, as is understood, thereby moving the shaft 204 linearly until the gear teeth 206 are aligned or engaged with the notches 104, as shown in FIG. 4. In some embodiments, for example, this may place the spring 212 in compression. Accordingly, the first end 202 may have a locking mechanism that locks the first end 202 in this engaged position. The locking mechanism may be any suitable means, such as but not limited to a bayonet lock, and may be locked or unlocked by the operator of the manual override tool. In some embodiments, locking and unlocking of the manual override tool may be performed by an operator gripping edges 304, and rotating first end 202 in a clockwise direction until rotation is no longer possible. At this point the manual override tool is engaged. After desired positioning of the override tool, an operator may again grip first end 202 via edges 304, and rotate in a counterclockwise direction until the lock is released.

Once engaged, the shaft 204 of the manual override tool may be rotated by rotating the first accessible end, for example using the nut 302. The nut 302 may be rotated, for example but not limited to, by hand, using wrench, or using a power drill with an attachment. Turning of the manual override tool causes rotation of the shaft 204 and thereby gear teeth 206. As a result of the interaction between gear teeth 206 and notches 104, rotation of the shaft 204 causes rotation of the flange 102, and thereby rotor 100. Rotation of the rotor 100 thus transfers into linear motion of the actuator thrust member, and may be continually rotated until the actuator thrust member is in a desired position. Accordingly, the improved manual override devices of the present disclosure make manually overriding an actuator much easier and quicker than it has typically been done. Once the manual override has been completed, the manual override tool may be unlocked from the engaged position and repositioned, in some embodiments by the bias of compression spring 212, back to its normal, disengaged position, as shown in FIG. 2. The cap 210 may be placed back over the accessible first end 202. In other embodiments, where the manual override tool is not an integral part of the actuator, the manual override tool may be disengaged by removing the tool from the actuator.

Although the various embodiments of the present disclosure have been described with reference to preferred embodiments, persons skilled in the art will recognize that changes may be made in form and detail without departing from the spirit and scope of the present disclosure.

We claim:

1. A manual override tool for an electrically powered linear actuator having a linear thrust member, a motor and an actuator housing, the manual override tool comprising:
    a shaft having an accessible first end exterior to the actuator housing and a distal end portion inserted into the actuator housing; and
    a plurality of gear teeth on the shaft;
    wherein the accessible first end is configured to control engagement and disengagement of the plurality of gear teeth by moving the shaft linearly until the gear teeth are engaged with a plurality of notches or gear teeth provided on a periphery of an interior rotor of the electrically powered linear actuator, the motor coupled to the interior rotor having a rotational axis to rotate a screw shaft within the actuator housing, such that the engagement provides mechanical advantage to generate torque while turning the manual override tool via the accessible first end;
    wherein the manual override tool is an integral part of the electrically powered linear actuator having the actuator housing and the linear thrust member, with the accessible first end exterior to the actuator housing and the distal end portion inserted into the actuator housing, and with the gear teeth on the shaft engaged with the interior rotor of the electrically powered linear actuator; and
    wherein the accessible first end is further configured to manually operate the electrically powered linear actuator such that rotation of the shaft causes rotation of the interior rotor and screw shaft which transfers into linear motion of the thrust member to a desired position; and
    wherein the manual override tool is configured for the shaft to be movable in a linear direction transverse to the rotational axis of the interior rotor, from an engaged position with the plurality of gear teeth engaged with the periphery of the interior rotor to a disengaged position in a normal operating mode of the electrically powered linear actuator.

2. The manual override tool of claim 1, further comprising a nut coupled to the accessible first end of the manual override tool, wherein the nut is configured to be rotatable by a wrench.

3. The manual override tool of claim 2, further comprising telescoping portions coupled to the accessible first end of the manual override tool, the telescoping portions configured for moving within one another, thereby moving the shaft of the manual override tool linearly until the gear teeth are engaged with the notches or gear teeth provided on the interior rotor of the electrically powered linear actuator.

4. The manual override tool of claim 3, wherein the telescoping portions further comprise knurled edges configured to provide grip for an operator to manipulate the telescoping portions and engage the manual override tool with the interior rotor of the electrically powered linear actuator.

5. The manual override tool of claim 4, further comprising a spring biasing the accessible first end of the manual override tool in a disengaged position.

6. The manual override tool of claim 1, further comprising a removable cap positioned over the accessible first end of the manual override tool.

7. The manual override tool of claim 1, wherein the gear teeth on the distal end portion of the shaft comprise a worm screw configured to engage a worm gear on the periphery of the interior rotor of the electrically powered linear actuator.

8. A manual override tool for an electrically powered linear actuator having an actuator housing, a motor and a linear thrust member, the manual override tool comprising:
    a shaft having an accessible first end exterior to the actuator housing and a distal end portion inserted into a hole in the actuator housing;
    a plurality of gear teeth on the shaft; and
    means for engaging and disengaging the plurality of gear teeth by moving the shaft linearly until the gear teeth are in engagement with a plurality of notches or gear teeth provided on a periphery of an interior rotor of the electrically powered linear actuator, the motor coupled to the interior rotor having a rotational axis to rotate a screw shaft within the actuator housing, such that the engagement provides mechanical advantage to generate torque while turning the manual override tool via the accessible first end;
    wherein the manual override tool is an integral part of the electrically powered linear actuator having the actuator housing and the linear thrust member, with the accessible first end exterior to the actuator housing and the distal end portion inserted into the actuator housing, and with the gear teeth on the shaft engaged with the interior rotor of the electrically powered linear actuator; and
    wherein rotation of the accessible first end manually operates the electrically powered linear actuator such that rotation of the interior rotor and screw shaft transfers into linear motion of the thrust member to a desired position; and
    wherein the shaft is movable in a linear direction transverse to the rotational axis of the interior rotor, from an engaged position with the plurality of gear teeth engaged with the periphery of the interior rotor to a disengaged position configured for a normal operating mode of the electrically powered linear actuator.

9. The manual override tool of claim 8, further comprising telescoping portions at the accessible first end of the manual override tool, the telescoping portions configured for moving within one another, thereby moving the shaft of the manual override tool linearly until the gear teeth are engaged with the interior rotor of the electrically powered linear actuator.

10. The manual override tool of claim 9, wherein the telescoping portions of the manual override tool comprise a metal alloy.

11. The manual override tool of claim 10, wherein the accessible first end of the manual override tool comprises knurled edges configured to provide grip for an operator to manipulate the telescoping portions and engage the manual override tool.

12. The manual override tool of claim 8, further comprising a compression spring biasing the shaft of the manual override tool in a disengaged position.

13. The manual override tool of claim 8, wherein the accessible first end of the manual override tool comprises a nut configured to be rotatable by a wrench in order to manually operate the electrically powered linear actuator.

14. A method for using the manual override tool of claim 8 for positioning the electrically powered linear actuator, the method comprising:
engaging the plurality of notches or gear teeth provided on the interior rotor of the electrically powered linear actuator with the manual override tool; and
rotating the accessible first end of the manual override tool to manually position the thrust member of the electrically powered linear actuator in the desired position.

15. The method of claim 14, further comprising disengaging the manual override tool from the plurality of notches or gear teeth on the interior rotor of the electrically powered linear actuator.

16. The method of claim 14, further comprising locking the manual override tool in an engaged position.

17. The method of claim 16, wherein locking the manual override tool in the engaged position comprises overcoming a bias of a compression spring biasing the manual override tool in a disengaged position.

18. The method of claim 17, further comprising unlocking the manual override tool from the engaged position and allowing the compression spring to return the tool to the disengaged position.

19. The method of claim 16, wherein locking the manual override tool in the engaged position comprises compressing at least one telescoping portion coupled to the accessible first end of the manual override tool.

20. A manual override tool integral to a linear actuator having a thrust member, an electric motor and an actuator housing, the manual override tool comprising:
a shaft having an accessible end exterior to the actuator housing and a distal portion inside the actuator housing; and
a plurality of gear teeth on the distal portion of the shaft, proximate an interior rotor;
wherein the accessible end is configured to control engagement and disengagement of the plurality of gear teeth with the interior rotor by moving the shaft in a linear direction transverse to a rotational axis of the interior rotor, from an engaged position in which the gear teeth are engaged with a plurality of notches or gear teeth provided on an outer peripheral edge of the interior rotor for manual operation of the linear actuator to a disengaged position in which the gear teeth are disengaged from the interior rotor for normal operation of the linear actuator;
wherein the electric motor is coupled to the interior rotor to rotate a screw shaft within the actuator housing and the engagement provides mechanical advantage to generate torque while turning the manual override tool via the accessible end, in order to manually operate the linear actuator such that rotation of the shaft causes the rotation of the interior rotor and screw shaft about the rotational axis which transfers into linear motion of the thrust member to a desired position.

21. The manual override tool of claim 20, wherein the gear teeth on the distal portion of the shaft comprise a worm screw configured to engage a worm gear on the periphery of the interior rotor.

* * * * *